Figure 1:
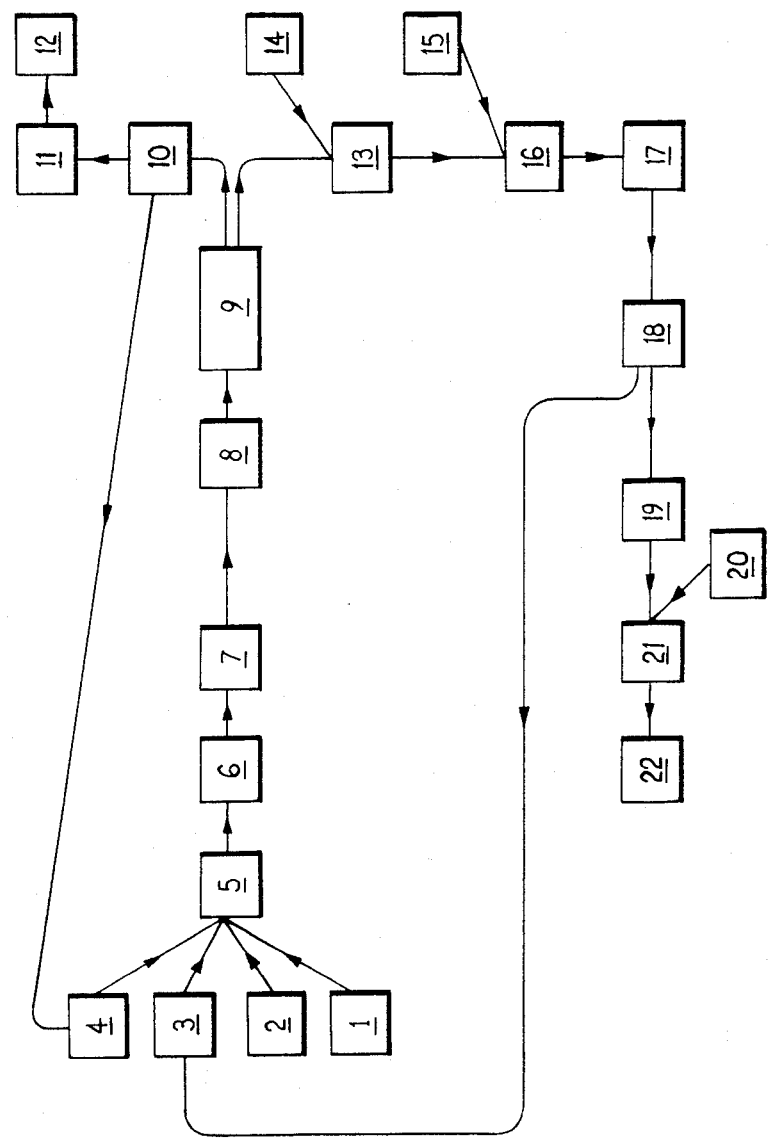

United States Patent [19]

Nielsen et al.

[11] Patent Number: 4,512,809
[45] Date of Patent: Apr. 23, 1985

[54] PROCESS FOR PRODUCING, FROM ALUMINOUS SILICEOUS MATERIALS, CLINKER CONTAINING ALKALI METAL ALUMINATE AND DICALCIUM SILICATE, AND USE THEREOF

[75] Inventors: Hans C. A. Nielsen, Copenhagen, Denmark; Roberto Schroeder, Mexico City, Mexico

[73] Assignee: Industrias Penoles S.A. de C.V., Mexico

[21] Appl. No.: 573,811

[22] Filed: Jan. 25, 1984

Related U.S. Application Data

[63] Continuation of Ser. No. 392,389, Jun. 28, 1982, abandoned.

[30] Foreign Application Priority Data

Jul. 6, 1981 [GB] United Kingdom ............... 8120849

[51] Int. Cl.³ .................... C04B 7/24; C01F 7/02
[52] U.S. Cl. .................... 106/103; 106/100; 423/111; 423/119; 423/122; 423/127
[58] Field of Search ............. 423/119, 122, 111; 106/100, 103

[56] References Cited

U.S. PATENT DOCUMENTS

| 1,508,777 | 9/1924 | Cowles | 423/119 |
| 3,584,848 | 6/1971 | Kiyonaga | 106/100 |
| 4,039,277 | 8/1977 | Kobayashi et al. | |
| 4,280,987 | 7/1981 | Yamada et al. | 423/119 |

FOREIGN PATENT DOCUMENTS

| 499855 | 6/1936 | United Kingdom . |
| 524237 | 1/1939 | United Kingdom . |
| 506734 | 11/1939 | United Kingdom . |
| 836122 | 3/1956 | United Kingdom . |
| 944127 | 3/1960 | United Kingdom . |
| 1326163 | 2/1971 | United Kingdom . |
| 1520186 | 7/1976 | United Kingdom . |
| 2032907 | 10/1978 | United Kingdom . |

*Primary Examiner*—Herbert T. Carter
*Attorney, Agent, or Firm*—Brumbaugh, Graves, Donohue & Raymond

[57] ABSTRACT

Aluminous siliceous starting materials are mixed and ground with correction materials to produce a raw mixture comprising oxides of aluminium, silicon, calcium and alkali metal having certain mole ratios, preheating the raw mixture by suspending the raw mixture in a hot gas, and sintering the preheated material to clinker.

7 Claims, 2 Drawing Figures

PROCESS FOR PRODUCING, FROM ALUMINOUS SILICEOUS MATERIALS, CLINKER CONTAINING ALKALI METAL ALUMINATE AND DICALCIUM SILICATE, AND USE THEREOF

This application is a continuation of application Ser. No. 392,389, filed on June 28, 1982, and now abandoned.

The present invention concerns a process (hereinafter referred to as of the kind described) for producing, from aluminous siliceous starting materials, clinker containing alkali metal aluminate and dicalcium silicate, the process including the steps of mixing and grinding the aluminous siliceous starting materials with correction materials to produce a finely ground dry raw mixture comprising oxides of aluminium, silicon, calcium and alkali metal having mole ratios $CaO/SiO_2$ and alkali metal oxide/$Al_2O_3$ substantially equal to two and one respectively; and sintering the first raw mixture to clinker containing alkali metal aluminate and dicalcium silicate in a burning step.

Aluminum is produced by electrolytic reduction of alumina, $Al_2O_3$. Any impurities contained in the alumina, except the alkali and alkaline earth metals, are also reduced to the metallic state. Accordingly the alumina fed to the reduction cells must be very pure. Iron and silicon are particularly undesirable impurities. The $Fe_2O_3$ content should not exceed 0.02 percent and the $SiO_2$ content should not exceed 0.05 percent. For the production of some grades of metal the $SiO_2$ content should not exceed 0.03 percent. Other undesirable impurities in alumina are titanium and phosphorus.

At present, nearly all aluminium metal is produced from alumina extracted from bauxite ores by the Bayer process. Bauxite, which consists essentially of hydrated aluminium oxide with smaller amounts of impurities such as iron and titanium oxides, is digested with a hot solution of sodium hydroxide in water to extract the alumina as a solution of sodium aluminate. The iron oxides and other impurities remain in the residue, and the alumina is precipitated as alumina trihydrate Al(OH)$_3$. Precipitation is effected by cooling or diluting the sodium aluminate solution and adding fine crystals of aluminium hydroxide from a previous batch to act as seed crystals.

For many years research has been carried out to develop processes of manufacturing alumina economically from non-bauxite sources, i.e. aluminous siliceous materials, comprising complex aluminium silicates.

Two interesting processes are based on the reactions occuring during sintering the aluminous siliceous material, with calcareous material such as limestone to clinker whereby the silicates are converted to dicalcium silicate ($C_2S$) which is insoluble in water, and the aluminium is converted into water soluble aluminates. Alumina is subsequently recovered by leaching the cooled and disintegrated clinker with a caustic alkali solution, precipitating the minor amounts of silica present in the leaching solution in a desilication step, and precipitating alumina from the desilicated leaching solution.

Two variants have been known for the last hundred years:

(1) The lime method where a finely ground mixture of aluminous siliceous materials with a low content of alkali metals and limestone are sintered to clinker essentially consisting of dicalcium silicate and calcium aluminate.

(2) The lime soda method where a finely ground mixture of aluminous siliceous materials, preferably with a high content of alkali metals, limestone and optionally alkali metal compounds, such as soda, is sintered to clinker essentially consisting of dicalcium silicate and alkali metal aluminate.

In both methods the sintering is carried out at at least 1200° C., and is thus far more energy-consuming than the Bayer process, but a considerable improvement in the economy of the process can be achieved by erecting an associated cement production plant utilizing the dicalcium silicate by product as a raw material for the cement production.

The major drawback of the lime method stems from the fact that calcium aluminate is rather insoluble even in aqueous alkaline solutions. Accordingly the clinker must be disintegrated to a fine dust if a reasonable amount of aluminate is to be leached out.

The essential advantage of the lime method stems from the fact that dicalcium silicate normally transforms to a less dense gamma form on cooling below 675° C. causing a phenomenon known as dusting, i.e. spontaneous disintegration into a fine powder. However, this transformation does not occur in the presence of certain impurities including alkali metal oxides.

The major drawback of the like soda method is that the clinker burning is rather difficult for reasons explained below and that spontaneous disintegration does not occur.

On the other hand alkali metal aluminate is more easily soluble in water and alkaline solutions so that the clinker can be leached effectively even if it is only crushed to rather coarse particles.

The present invention concerns an improved version of the lime soda method.

It is known to carry out the sintering in the lime soda method analogous with the wet method known from the cement industry in which a slurry of the starting materials in water is fed to the upper end of a rotary kiln which is fired with fuel at the opposite end, c.f. e.g. U.S. Pat. No. 1,971,354 (Scheidt).

In order to improve the heat economy of the method it has been suggested to use variants of the dry method known from the cement industry in which the starting materials are fed to the upper end of a rotary kiln in a dry state, c.f. e.g. U.S. Pat. No. 2,141,132 (Folger).

The sintering at the clinker burning step differs, however, significantly from the sintering of cement clinker:

Firstly, a temperature increase of approximately 10°–20° C. above the sintering temperature of the aluminate/$C_2S$ clinker leads to formation of larger quantities of melt, whereas in cement manufacturing much larger albow-room is allowed.

Secondly, there is in the aluminate/$C_2S$ burning a marked tendency to excessive dust formations in the kiln by which segregation of the kiln charge arises with consequent instability in the clinker formation zone.

Thirdly, there is a tendency to ring formation and formation of great lumps in the rotary kiln.

These disadvantages have been sought to be avoided by pelletizing the raw materials and introducing them into a rotary kiln fired co-currently with the kiln charge, c.f. U.S. Pat. No. 2,420,852 (Archibald).

The object of the invention consists in providing a dry method for the sintering in the lime soda method, avoiding the above disadvantages, avoiding the pelletizing step and providing an improved heat economy.

It has surprisingly been found that this can be achieved, in accordance with the invention, by a process of the kind described, which is characterised in that the burning step comprises preheating the finely ground dry raw mixture to 700°–1050° C. by suspending the raw mixture in a hot gas in a preheating zone, precipitating the preheated mixture from the hot gas and sintering the precipitated material to clinker in a clinker burning zone.

As aluminous siliceous material there could be used any material that is cheap and readily available and contains at least 20% alumina, optionally occuring as complex aluminium silicates, such as naturally occuring ores like feldspars, leucite, nephelite, nepheline syenite, clay, shale, marl and siliceous bauxite, and industrial waste products such as blast furnace slag, residues from burning coal, e.g. fly ash, waste coal products, red mud from the Bayer process, white mud precipitated during the above mentioned desilication step, and others containing more or less silica. Preferred materials are materials with a relatively high alumina content, preferably such that have a content of alkali metal approximately equivalent to the alumina content, such as leucite, nephelite and nepheline syenite.

In order to obtain full conversion of the silicates to $C_2S$ and the alumina component to alkali metal aluminate correction materials must be added to the aluminous siliceous starting material. As this typically shows too low a content of CaO and alkali metal oxides, calcareous materials and alkali metal compounds are most often used as correction material.

By calcareous materials is to be understood any material comprising or dissociating into CaO at or below the sintering temperature, such as oxide, hydroxide or preferably carbonate of calcium, such as limestone, sea shells, coral rock, chalk, marl and industrial waste products containing CaO or $CaCO_3$.

Alkali metal compounds include carbonates, oxides, or hydroxides of alkali metals, in particular of sodium and potassium, such as soda, including industrial waste products, in particular alkali metal carbonate recovered from the leaching solution after precipitation of alumina and kiln dust from cement plants, in particular from an associated cement production plant.

In preparing the raw mixture, aluminous siliceous starting material, calcareous materials and alkali metal compounds are mixed in proportions depending on the analysis of these materials, but in such a way that the mole ratios $CaO/SiO_2$ and $Me_2O/Al_2O_3$ (Me means alkali metal) are approximately equal to 2 and 1 respectively.

The aluminous siliceous materials and the correction materials are ground together or separately and the mixture is homogenized before it is fed to the burning step.

It has surprisingly been found that preheating the raw mixture by suspending it in a hot gas provides an increased stability of the sintering in the clinker burning zone compared with the usual dry method described in U.S. Pat. No. 2,141,132 where the preheating takes place in the upper end of a long rotary kiln. The result is an easy leachable clinker product and improved operating conditions without the usual tendency of formation of rings and great lumps in the preheating and burning zones.

The preheating may be carried out in a, preferably multi stage, cyclone preheater known per se for heating fine materials, and the sintering process may be carried out in a short rotary kiln.

According to a preferred example the preheating comprises repeated suspension and precipitation of the raw mixture in countercurrent to the hot gas, which is exit gas from the clinker burning zone.

A particularly rapid and efficient preheating to 700°–1050° C., preferably to 800°–925° C., and most preferably to 850°–900° C., is thus achieved and no problem related to heavy dust formation, segregation of the raw mixture and blocking of the preheater are observed.

A particular advantageous process is characterized in that that the preheating comprises further heat transfer to the suspended raw mixture by introduction and combustion of fuel in the preheating zone.

Extremely stable working conditions are thus achieved, because a particularly stable feed to the clinker burning zone can be achieved and controlled by varying the amount of fuel introduced in the preheating zone. Further, the fuel supply to the clinker burning zone can be reduced significantly, eliminating the risk of overburning the clinker. Further, a particularly short treatment period is achieved, the retention time in the preheater being less than 30 seconds and the retention time in the clinker burning zone being about 10 to 15 minutes compared to the retention time of 2–5 hours in a long rotary kiln. No problems related to heavy dust formation, segregation of the raw mixture and blocking of the preheater were observed.

This development of the invention may be carried out in a multi stage cyclone preheater provided with a suspension burning furnace corresponding to the suspension calciners known from cement technology, with a material outlet connected to a short rotary kiln.

When no fuel is introduced in the preheating zone, degress of calcination of $CaCO_3$ are typically 20–30%. When fuel is burned in the preheating zone, a proper calcination zone is established in the preheating zone and higher degrees of calcination are obtained, typically 75–95%, preferentially 85–90%.

When the preheater includes such a calcination zone, hot exit air from an air cooler for the clinker may be used as an air supply and the exit gas from the calcination zone may be used as hot gas in the preheating zone, preferentially mixed with exit gas from the clinker burning zone. The exist gas from the clinker burning zone may be introduced into the preheating zone via the calcination zone, e.g. together with the hot air from the clinker cooler. In order to reduce alkali recirculation in the preheating zone, 10–100% of the above mentioned exit gas may by-pass the preheating zone.

An important use for the clinker produced in accordance with the invention is as an intermediate product in the production of alumina and hydraulic cement. These end products may be produced from the clinker by the steps of cooling and disintegrating the clinker; leaching the alkali metal aluminate from the disintegrated clinker by means of a caustic alkali leaching solution, thereby leaving a leaching residue containing the dicalcium silicate; precipitating alumina from the leaching solution; preparing a second raw mixture by recovering and mixing the leaching residue with calcareous correction materials; and sintering the second raw mixture to cement clinker in a second burning step. This is described in more detail in our copending application of even date, Ser. No. 392,388 filed June 28, 1982.

The second burning zone may comprise a kiln and in that case the correction materials in the first raw mixture may include dust from the kiln.

Figure 2:
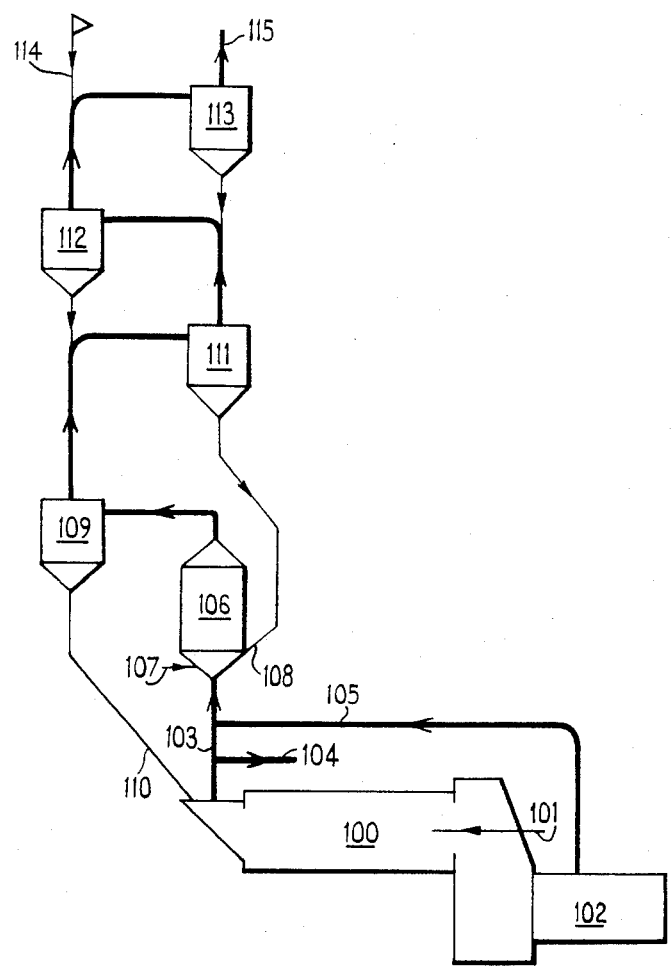

The invention will now be described, by way of example, with reference to the accompanying drawings, in which:

FIG. 1 shows a flow chart of a plant for combined production of alumina and cement including the process according to the invention; and, FIG. 2 shows an apparatus suited for carrying out the process according to the invention.

From storage bins 1, 2, 3, and 4 for nepheline syenite, limestone, alkali metal correction materials and white mud, respectively, streams of these materials are directed to a raw mill 5. The fine dry product from the raw mill 5 is directed to a homogenizing storage silo 6 from which the material is fed to an apparatus 7 where it is burned to clinker containing alkali metal aluminate and dicalcium silicate. The cooled clinker is crushed in a crusher 8 and leached with alkaline extraction liquid in a leaching apparatus 9. The alkali metal aluminate containing filtrate is desilicated in a silica precipitating apparatus 10. The precipitated white mud is directed to the white mud storage bin 4 and the filtrate is directed to a precipitation tank 11 in which alumina is precipitated. The alumina is dried to a high purity alumina end product which is deposited in an alumina storage bin 12.

The dicalcium silicate residue obtained in the leaching apparatus 9 is washed with water and mixed with red clay from a red clay storage bin 14, dried in a dryer 13, admixed with limestone from a limestone storage bin 15, and directed to a raw mill 16. The fine dry product from the raw mill 16 is directed to a homogenizing storage silo 17 from which it is fed to a cement burning plant 18 where the material is burned to cement clinker. Kiln gas dust from the cement burning is directed to the alkali metal correction material storage bin 3. The cooled clinker is stored in a clinker storage bin 19, mixed with a minor amount of gypsum from a storage bin 20 and milled to cement in a cement mill 21. The cement end product is stored in a cement storage bin 22.

FIG. 2 shows a preferred construction for the apparatus 7 and for the plant 18 and thus for carrying out the essential process according to the invention. A short rotary kiln 100 is provided with a fuel inlet 101, a clinker air cooler 102, a riser pipe 103 for exit gas provided with a by-pass duct 104, and a hot air inlet duct 105 connected to the clinker cooler 102. The mixture of kiln exit gas and hot air is introduced in a suspension calciner 106 provided with a fuel inlet 107 and an inlet 108 for preheated raw material which is calcined in suspended state and carried to a precipitation cyclone 109 with the exit gas from the suspension calciner. The precipitated material is directed to a material inlet 110 in the rotary kiln 100 and the hot gas from which the material is precipitated is directed to a multistage cyclone preheater, comprising three cyclones 111, 112 and 113, provided with a raw material inlet 114 and a gas outlet 115.

The method according to the invention was carried out on an industrial scale in a combined alumina/cement production plant having the flow sheet shown in FIG. 1. The burning steps took place in an apparatus as shown in FIG. 2. Test results from a typical run appear from the following example.

EXAMPLE (1) Alumina Recovery 240 units by weight of nepheline syenite and 460 units by weight of limestone having the analysis shown in Table I (in which all percentages are by weight); together with 20 units by weight of white mud containing about 15-25% $Al_2O_3$, 5-15% $SiO_2$, and 5-20% alkali metal oxides; and 10 units by weight of by pass dust containing about 40% alkali metal oxides from the second burning step were ground to a fineness corresponding to 25% greater than 0.08 mm.

The fine mixture was homogenized to a first raw mixture having mole ratios $CaO/SiO_2$ and $Me_2O/Al_2O_3$ (Me means alkali metal) equal to approximately 2 and 1, respectively, and fed to an apparatus as shown in FIG. 2 comprising a cyclone preheater fed with exit gas from a suspension furnace with a gas inlet connected to the exit gas outlet of a short rotary kiln and the exit air outlet of a grate clinker cooler cooling the clinker produced in the short rotary kiln. Only 75% of the rotary kiln exit gas was directed to the suspension furnace the remaining 25% was removed and by-passed in order to reduce the alkali concentration of the hot gases in the kiln suspension furnace and cyclone preheater.

In less than 30 seconds the raw mixture was preheated to about 750° C. in the cyclone preheater and in less than 2 seconds it was heated to 850°-900° C. in the suspension furnace and directed to the rotary kiln where it was sintered to clinker at a sintering temperature of 1320° C. The retention time in the rotary kiln was only 10 to 15 minutes.

490 units by weight of clinker were obtained. The clinker was crushed to below 2 mm and leached with alkaline extraction liquid. A filtrate containing 80 units by weight of alkali metal aluminate of high purity (containing less than 3% $SiO_2$ and less than 0.1% $Fe_2O_3$ on dry weight basis) and a $C_2S$ residue was obtained.

The filtrate was first subjected to a desilification process in which the small amounts of silica present in the filtrate were removed from the filtrate and converted to the white mud mentioned above and then alumina was precipitated by reducing the pH-value of the filtrate. A high quality alumina product was thus obtained with an $Al_2O_3$ recovery of 78%.

The $C_2S$ residue was washed with water and showed an $Al_2O_3$ content of less than 2.5% and an alkali metal oxide content of less than 2% indicating an efficient conversion of the complex aluminium silicates to alkali metal aluminate and $C_2S$.

(2) Cement Production 1000 units by weight of a dry cement raw mixture was prepared by drying 670 units by weight of the $C_2S$ residue and 70 units by weight of red clay and grinding these components with 550 units by weight of limestone to a fineness corresponding to 25% greater than 50 micron. Analysis of the red clay, limestone and cement raw mixture is shown in Table I.

The cement raw mixture was burnt to cement clinker in a second burning step in an apparatus of the design shown in FIG. 2.

Retention times were: in the cyclone preheater less than 30 seconds; in the suspension furnace less than 2 seconds; and in the short rotary kiln less than 20 minutes. Kiln by pass was 60%.

Material was introduced into the suspension furnace at about 750° C.; the temperature in the suspension furnace was 850°–900° C.; and the sintering temperature was about 1450° C.

790 units by weight of cement clinker were produced. The kiln by pass dust amounted to 15 units by weight. Analysis of the cement clinker is shown in Table I.

The cement clinker was ground and mixed with 30 units by weight of gypsum in the usual way producing 720 units by weight of portland cement of high quality with low alkali and free lime content.

TABLE I

| Material | Nepheline Syenite % | Limestone % | Red Clay % | Cement Raw Mix % | Cement Clinker % |
|---|---|---|---|---|---|
| $Al_2O_3$ | 20.6 | 0.2 | 23.8 | 3.0 | 3.8 |
| $Na_2O$ | 8.9 | Total Oxides | 0.04 | Total Oxides | Total Oxides |
| $K_2O$ | 6.3 | less than 0.2 | 0.13 | less than 2.0 | less than 0.5 |
| CaO | 1.3 | 50.0 | 0.4 | 53.2 | 66.7 |
| $CO_2$ | 1.3 | 40.9 | 0.6 | 18.5 | — |
| $SiO_2$ | 51.3 | 1.0 | 20.3 | 18.6 | 23.3 |
| $Fe_2O_3$ | 3.3 | 0.2 | 6.5 | 1.7 | 2.0 |

We claim:

1. A process for the production of clinker containing alkali metal aluminate and dicalcium silicate from aluminous siliceous starting materials including the steps of mixing and grinding the aluminous siliceous starting material with at least one of the group consisting of calcareous correction materials and alkali metal-containing correction materials to a finely ground dry raw mixture comprising oxides of aluminium, silicon, calcium and alkali metals having the mole ratios $CaO/SiO_2$ and $Me_2O/Al_2O_3$ (Me=alkali metal) equal to approximately 2 and 1, respectively, and sintering the raw mixture to clinker containing alkali metal aluminate and dicalcium silicate in a burning step comprising preheating said finely ground dry raw mixture to 700°–1050° C. by suspending said raw mixture in a hot gas in a preheating zone, precipitating said preheated material from said hot gas to provide a precipitated material and sintering said precipitated material to said clinker in a clinker burning zone in a rotary kiln in a period of 10 to 15 minutes.

2. A process according to claim 1, wherein said preheating comprises repeated suspension and precipitation of said raw mixture in countercurrent to said hot gas, and wherein said hot gas is exit gas from said clinker burning zone.

3. A process according to claim 1 or claim 2, wherein said preheating comprises further heat transfer to said suspended raw mixture by introduction and combustion of fuel in said preheating zone.

4. A process according to claim 1 including process steps for recovering alumina and producing hydraulic cement, from aluminous siliceous starting materials, said process comprising the steps of mixing and grinding said aluminous siliceous starting materials with correction materials thereby to produce a finely ground dry first raw mixture comprising oxides of aluminium, silicon, calcium and alkali metal having the mole ratios $CaO/SiO_2$ and alkali metal oxide/$Al_2O_3$ approximately equal to two and one respectively; sintering said first raw material to clinker containing alkali metal aluminate and dicalcium silicate in a first burning step; cooling and disintegrating said clinker; leaching said alkali metal aluminate from said disintegrated clinker by means of a caustic alkali leaching solution, thereby leaving a leaching residue containing said dicalcium silicate; precipitating alumina from said leaching solution; preparing a second raw mixture by recovering and mixing said leach residue with calcareous correction materials; and sintering said second raw mixture to cement clinker in a second burning step; said first burning step further comprising preheating said finely ground dry first raw mixture to 700°–1050° C. by suspending said first raw mixture in a hot gas in a preheating zone, precipitating said preheated mixture from said hot gas to provide a precipitated material and sintering said precipitated material to said clinker in a clinker burning zone in a period of 10 to 15 minutes.

5. A process according to claim 4, wherein said preheating comprises repeated suspension and precipitation of said first raw mixture in countercurrent to said hot gas, and wherein said hot gas is exit gas from said clinker burning zone.

6. A process according to claim 4 or claim 5, wherein said preheating comprises further heat transfer to said suspended first raw mixture by introduction and combustion of fuel in said preheating zone.

7. A process according to claim 4, wherein said second burning step utilizes a kiln and said correction materials in said first raw mixture include dust from said kiln.

* * * * *